United States Patent [19]

Bodine

[11] Patent Number: 4,566,800
[45] Date of Patent: Jan. 28, 1986

[54] SONIC DEVICE FOR EXTRACTING MINERALS FROM ORE

[76] Inventor: Albert G. Bodine, 7877 Woodley Ave., Van Nuys, Calif. 91406

[21] Appl. No.: 570,394

[22] Filed: Jan. 13, 1984

[51] Int. Cl.$^4$ .......................... B01F 11/00; B06B 1/16
[52] U.S. Cl. .................................. 366/118; 366/128; 366/600
[58] Field of Search .............. 74/87; 310/81; 366/118, 366/123, 124, 128, 600; 422/127, 281

[56] References Cited

U.S. PATENT DOCUMENTS

| | | | |
|---|---|---|---|
| 1,763,845 | 6/1930 | Edgerton | 422/281 |
| 2,194,410 | 3/1940 | Svenson | 74/87 |
| 2,942,849 | 6/1960 | Bodine | 366/128 |
| 2,960,317 | 11/1960 | Bodine | 366/600 |
| 3,123,305 | 3/1964 | Eisenkraft | 366/108 |
| 3,217,551 | 11/1965 | Bodine | 74/87 |
| 3,402,611 | 9/1968 | Schwenzfeier | 74/87 |
| 3,525,606 | 8/1970 | Bodine | 75/101 |
| 3,544,073 | 12/1970 | Bodine | 366/600 |

Primary Examiner—Philip R. Coe
Attorney, Agent, or Firm—Edward A. Sokolski

[57] ABSTRACT

A unit, which generates sonic energy for use in the leaching or extraction of minerals from ore, is mounted in a tank which contains the leaching solution and the ore. The unit has a housing in which a solid bar is supported by means of a rod which fits into a bored out bottom portion of the bar which is along the longitudinal axis thereof, as well as a plurality of resilient lateral spoke members which protrude inwardly from the housing and abut against the bar. An orbiting mass oscillator is mounted on the bar on the top end thereof and is rotatably driven to effect resonant standing wave vibration of the bar in a quadrature nutating vibration mode. The oscillator is positioned above the leaching solution and the ore so that it is free therefrom, the rod member used to support the bar and the resilient lateral support members being abutted against the bar at nodes of the standing wave vibration pattern established in the bar to minimize energy losses into the housing.

5 Claims, 8 Drawing Figures

SONIC DEVICE FOR EXTRACTING MINERALS FROM ORE

This invention relates to the use of sonic energy in the extraction of ore, and more particularly to such a device employing an orbiting mass oscillator which effects resonant standing wave vibration of a bar member supported in a leaching solution or the like.

The leaching or extraction of metals from ore involves the utilization of a solution in which the metal salts or mineral particles in the ore will dissolve or become entrained and then are extracted. It has been found that by subjecting the leaching solution containing the ore to high level sonic energy, the time necessary for achieving the leaching process can be significantly reduced, and the total recovery of mineral can be improved. Such a method is described in my U.S. Pat. No. 3,525,606, issued Aug. 25, 1970. In the method of this patent, a resonator tube is supported within a leaching tank in a manner such that it has a substantial degree of vibration isolation therefrom. An orbiting mass oscillator is mounted within the tube at a point near the center thereof and driven at a frequency such as to set up resonant vibration of the tube to effect the desired end results. In the implementation of the just described embodiment of my prior patent, the resonant tube is supported on the tank by means of a clamp which attaches to the tube along the periphery thereof. It has been found that coupling at this point, in view of the quadrature nutating oscillation of the tube, tends to result in a significant energy dissipation, even though such coupling is made close to a nodal point of the vibration pattern, in view of the fact that the true nodal point actually lies on the axis of the tube. Further, the placement of the oscillator near the center of the longitudinal extent of the tube places it in position of high load, i.e., where the leaching solution is located, and thus limits the amplitude of stroke of the oscillator which deleteriously affects the power input capability of the oscillator.

The device of the present invention overcomes the aforementioned shortcomings of the prior art by employing a solid bar member for the resonator element which is supported within a housing in a manner which minimizes the dissipation of energy from the bar member into the housing so that such energy can be employed in an optimum manner in the leaching process. This end result is achieved by employing a rod member supported on the housing which extends into a bored out portion of the resonant bar member. This bored out portion is along the longitudinal axis of the bar and coaxial with such member, and is at the lower end of such bar member. The bar member rests on the upper end of the support rod at a point along the rod member which corresponds to a node of the standing wave vibration pattern. A plurality of spoke-like resilient isolator members are employed to center and hold the bar member against rotation within the housing, these isolator members also being placed at nodal points along the vibration pattern. The oribiting mass oscillator is placed at the upper end of the bar member away from the leaching solution and the ore so that it is away from the load and can achieve high amplitude output. Also, typically, the oscillator will be located at least one wavelength away from the opposite end of the vibration pattern set up in the resonant bar member. It is to be noted that the resilient "spoke" members which abut against the bar prevent unwanted rotation of the bar, but at the same time permit free nutation thereof without there being significant energy losses in the support structure.

It is therefore an object of this invention to improve the efficiency of the extraction of mineral from ore.

It is a further object of this invention to minimize the wasteful dissipation of sonic energy in the sonic leaching (or the like) of ore.

Other objects of this invention will become apparent as the description proceeds in connection with the accompanying drawings, of which:

Figure 1:
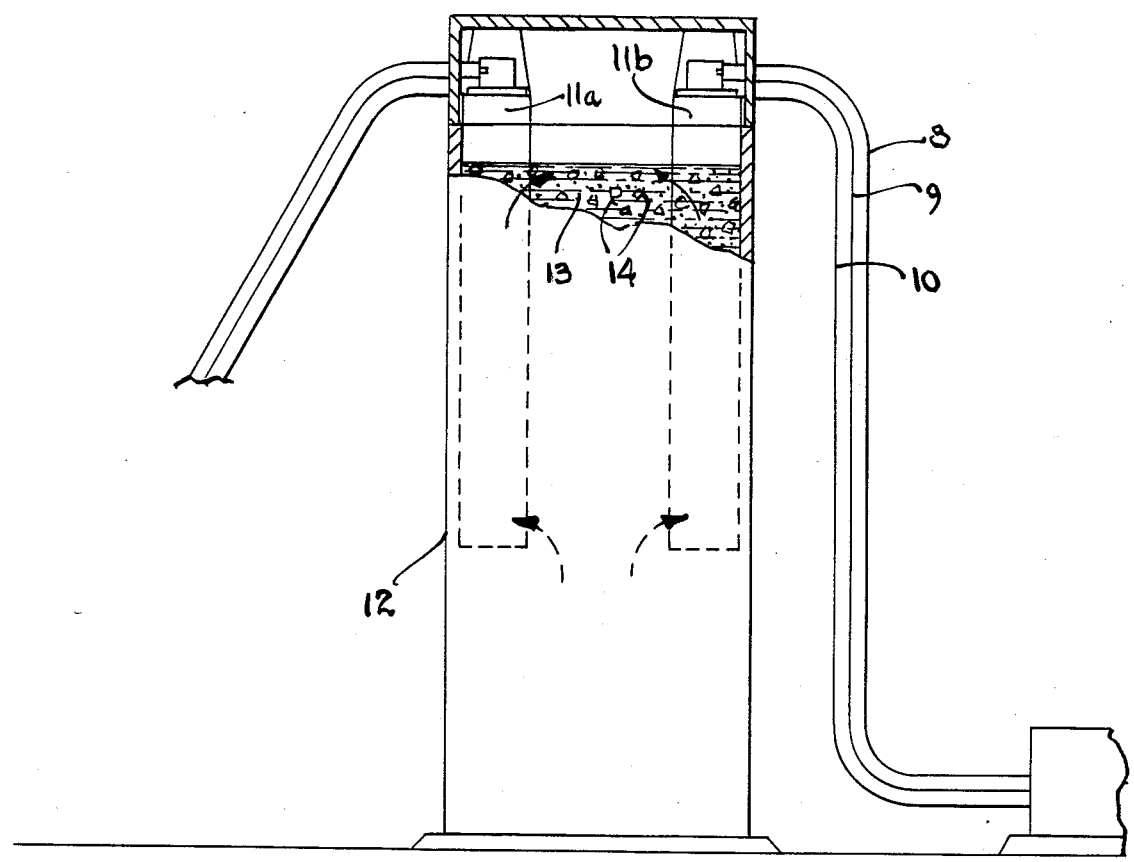
FIG. 1 is a schematic drawing illustrating the employment of the device of the present invention in the leaching of ore.

Referring now to FIG. 1, the use of a pair of units of the device of the invention in the leaching of ore is illustrated. Sonic leacher units 11a and 11b are suspended by suitable mounting means (not shown) within leaching tank 12. Contained within tank 12 are a leaching solution 13, having ore particles 14 contained therein. Three hydraulic lines 8-10 are schematically shown, these being for respectively providing fluid pressure, a fluid return and a motor case drain line.

Figure 3:
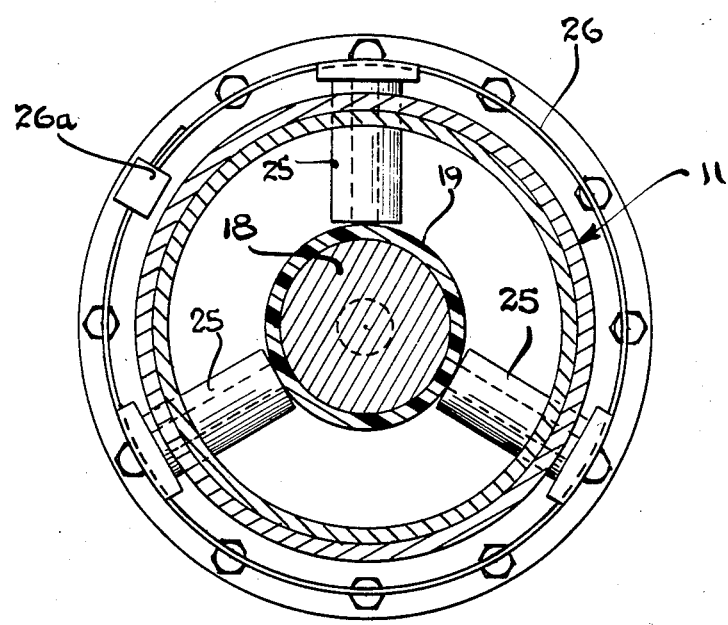
FIG. 3 is a cross-sectional view taken along the plane indicated by 3—3 in FIG. 2B.
Figure 2A:
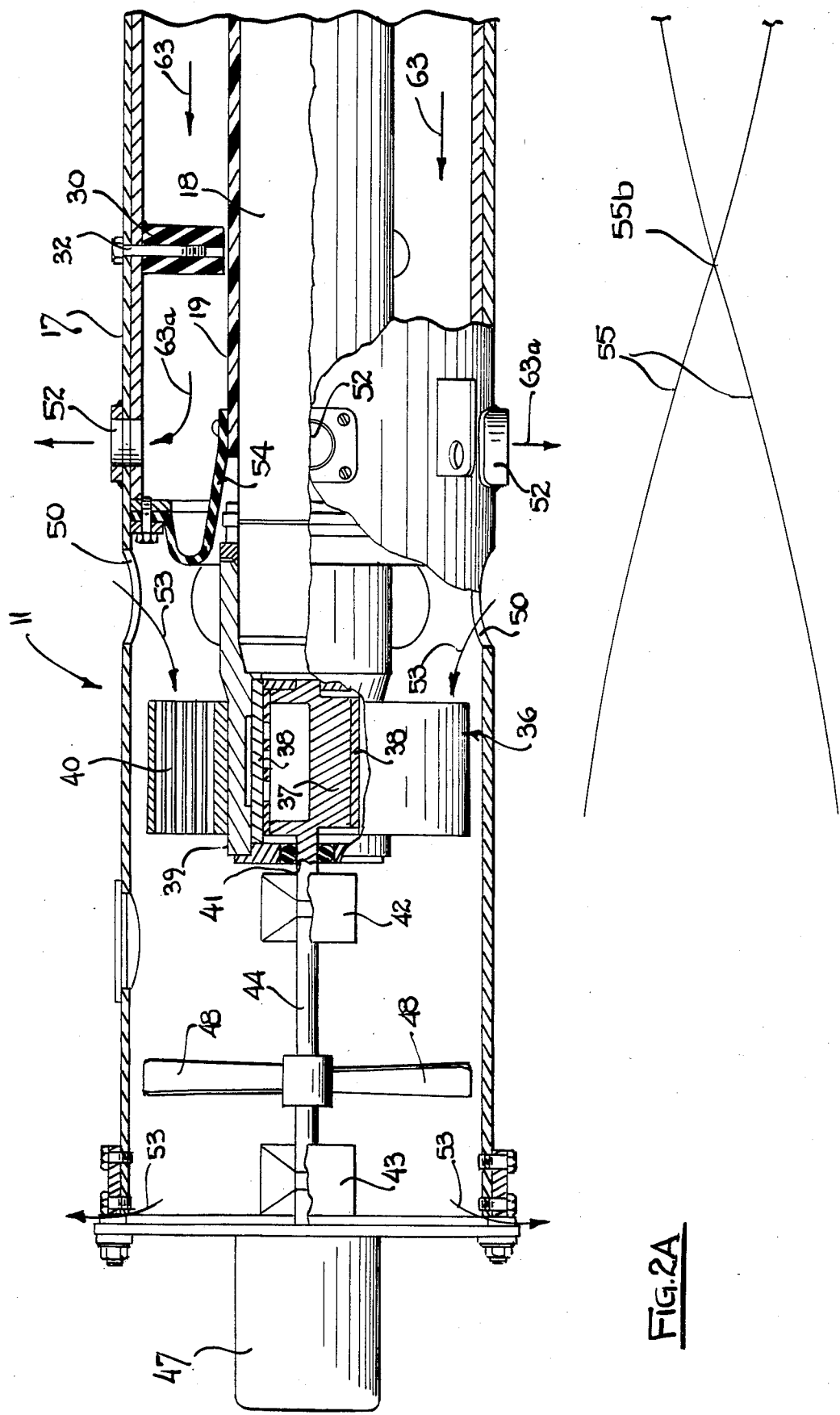
FIGS. 2A and 2B are cross-sectional views illustrating the top and bottom portions of a preferred embodiment of the invention.
Figure 2B:
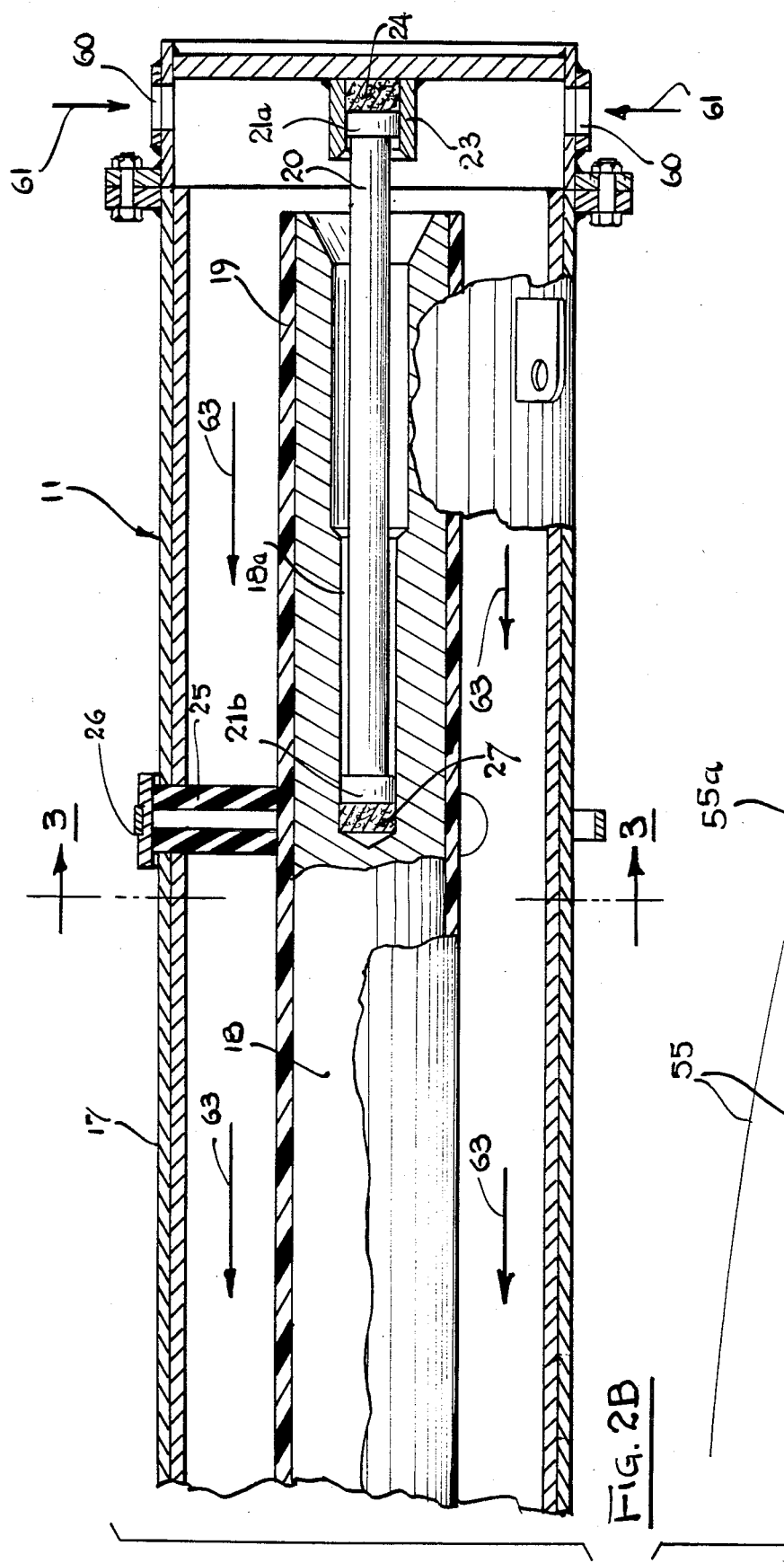

Referring now to FIGS. 2A, 2B and 3, a preferred embodiment of the sonic device of the invention is illustrated. It is to be noted that FIG. 2A illustrates the top portion of the unit, while FIG. 2B illustrates the bottom portion thereof, these two portions being shown separately for convenience of illustration. Supported within housing 17 is a solid bar member 18 which is preferably fabricated of a material having high elasticity, such as steel, and may have a thick coating 19 on the outside wall thereof of a rubber-like material such as polyurethane. Solid bar member 18, which in a typical installation is vertically oriented within a leaching tank as illustrated in FIG. 1, is supported within housing 17 on support rod 20. Support rod 20, which is fabricated of a high strength material such as steel, has cylindrical sleeves 21a and 21b fixedly attached to the opposite ends thereof, as for example by welding, these sleeves having a greater diameter than that of rod 20. Sleeve 21a fits snugly within receptacle 23 welded to the base of housing 17 and abuts against a cushioning member 24 which may be of a suitable elastomeric material, such as rubber. Similarly, sleeve 21b fits snugly within the bored portion 18a of solid bar 18 and abuts against cushioning member 27. It is to be noted that bored portion 18a is coaxial with the longitudinal axis of bar member 18. Bar member 18 is retained in centered position and prevented from rotating (yet permitted to nutate) by means of cushioned spoke members 25 which are spaced around the periphery of bar 18 and abut there-against, as best can be seen in FIG. 3. Cushioned spoke member 25 may be fabricated of an elastomeric material such as rubber and are retained in tight engagement against the coating 19 of bar member 18 by means of steel band 26 which is tightened by means of band tightener 26a. An additional set of spoke members 30 are employed as spacers along an upper portion of bar 18 and are mounted on the wall of housing 17 around the periphery of bar 18 by means of bolts 32. It is to be noted that spacer members 30 are installed in a loose fit around bar 18 to permit maximum freedom of the bar.

Mounted on the top end of bar member 18 is an orbiting mass oscillator 36, which may be of the type described in connection with my U.S. Pat. No. 4,265,129. This oscillator comprises an eccentric rotor 37 which is rotatably mounted on slipper or sleeve bearing 38 within housing 39, the housing being fixedly attached to bar member 18. As descritive in U.S. Pat. No. 4,265,129, oil is fed to the oscillator housing to form an oil cushion between the rotor and housing. Cooling fins 40 are provided in the housing. Drive shaft 41 of rotor 37 is coupled through U joints 42 and 43 and shaft 44 to the drive shaft of motor 47. A fan 48 is mounted on shaft 44 and provides cooling for the oscillator and the associated components. Apertures 50 are formed in the walls of housing 17 to facilitate to facilitate the flow of cooling air as indicated by arrows 53. Outlet ports 52 are provided to permit the outlet of leaching fluid and ore material which enters housing 17 through inlet ports 60. A boot member 54, which runs around the top portion of bar 18, is employed to prevent liquid and ore from entering the top portion of the unit.

In operation, the device of the invention operates as follows. The speed of rotation of rotor 37 is adjusted until a standing wave vibration pattern is set up in bar member 18, as evidenced by a marked increase in amplitude of vibration. At the resonant frequency, a nearly maximized standing wave vibration pattern is set up in the bar, as indicated by graph lines 55. As can be seen, the device is designed so that the standing wave pattern is such that the nodes 55a and 55b appear along the bar where there is mounting of the bar in the housing, i.e., node 55a is at the connecting region of rod 20 and spoke members 25, while node 55b appears opposite spoke members 30. Thus, a minimal amount of energy is dissipated into the housing.

Leaching liquid and ore material contained therein by virtue of suitable pumping enter the bottom of the housing through ports 60, as indicated by arrows 61, and flow upwardly in the housing along the sides of bar 18, as indicated by arrows 63. It is to be noted in this regard that the vibrational energy flows from oscillator 36 in a opposite direction to the flow of leaching fluid and ore. The ore and leaching material exits from the housing through ports 52 as indicated by arrows 63a. As can be seen, oscillator 36, is at the top of the bar and at a location of light load, that is away from the ore and leaching liquid, and is at an antinode of vibration and at a point where high amplitude of vibration of the bar is engendered. This facilitates the generation of high power output from the oscillator. The support of bar member 18 on rod 20, which is in contact with the bar only at the true vibration node point 55a along the longitudinal axis of the bar, avoids any unnecessary dissipation of energy into the housing, which is particularly significant in situations where high level energy is required for the leaching operation. Resilient spoke members 25, as already noted, prevent unwanted rotation of the bar, these spoke members also being located at an antinode 55a of the vibration pattern which further minimizes energy losses. Upper spoke members 30, which are also of resilient material and are located opposite node 55b of the vibration pattern, provide centering for the bar, yet are in loose contact therewith to further avoid interference with the nutational vibration of the bar.

It is highly desirable to maintain a body of the ore material being treated around the bar extending to a radial distance at least equal to the diameter of the bar and in some instances to a distance greater than four times such diameter. This tends to keep the energy level in the ore below that which could adversely affect the leaching agent by overheating or over cavitating such agent. With a depth of ore material to at least four times the bar diameter, the bar can be driven to an amplitude which is not in any way limited by any adverse reaction which might occur in the leaching agent.

Figure 4:
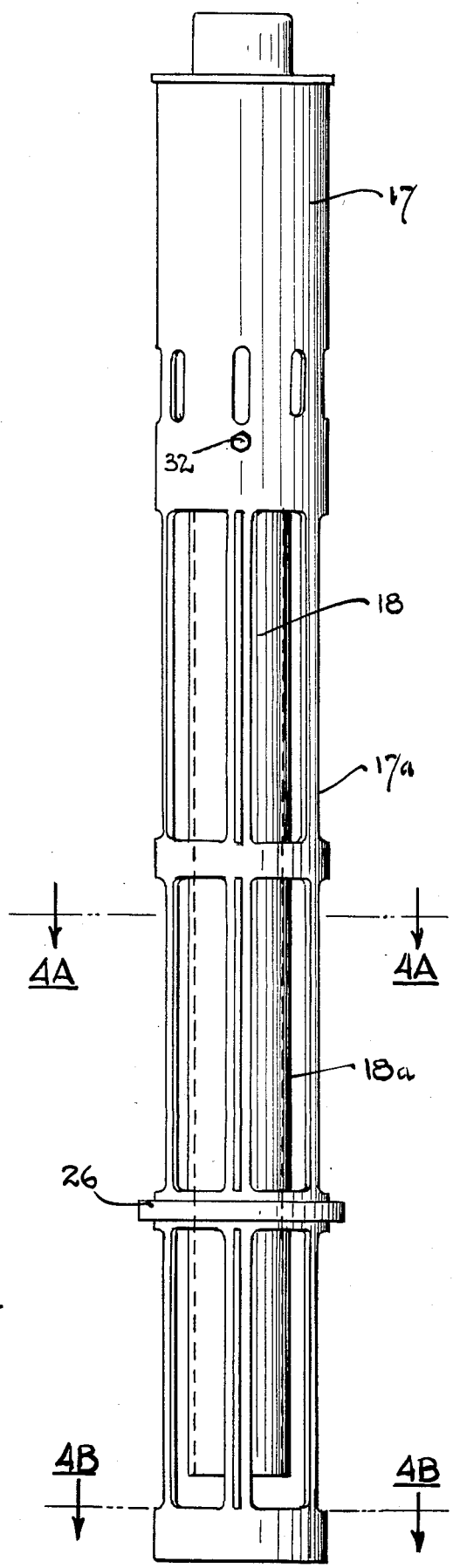
FIG. 4 is an elevational view illustrating a second embodiment of the invention utilizing an open-slat structure for the housing.
Figure 4A:
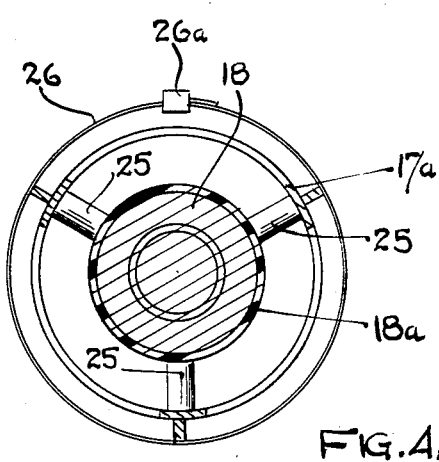
FIG. 4A is a cross-sectional view taken along the plane indicated by 4A—4A in FIG. 4.
Figure 4B:
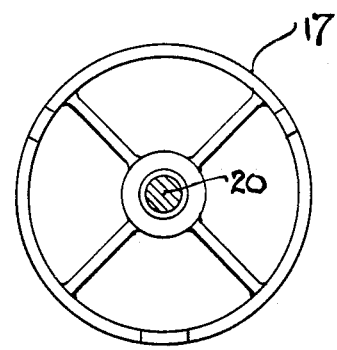
FIG. 4B is a cross-sectional view taken along the plane indicated by 4B—4B in FIG. 4.

Referring now to FIGS. 4, 4A and 4B, a modification of the device of the invention is illustrated. In this embodiment, the housing 17 has a plurality of slats 17a to form an open lattice structure which permits the fluid to freely surround vibration bar member 18. In this embodiment, the same rod structure 20 as for the previous embodiments is provided for supporting bar 18 within the housing and similar resilient posts 25 and 30 as for the previous embodiment are employed in the aid of centering and support of the bar, these posts being located at the nodal regions as in the previous embodiment. The advantage of the embodiment of FIGS. 4–4B is that it can be utilized in an open vat tank obviating the need for pumps for pumping fluid along the side of the bar member.

Figure 5:
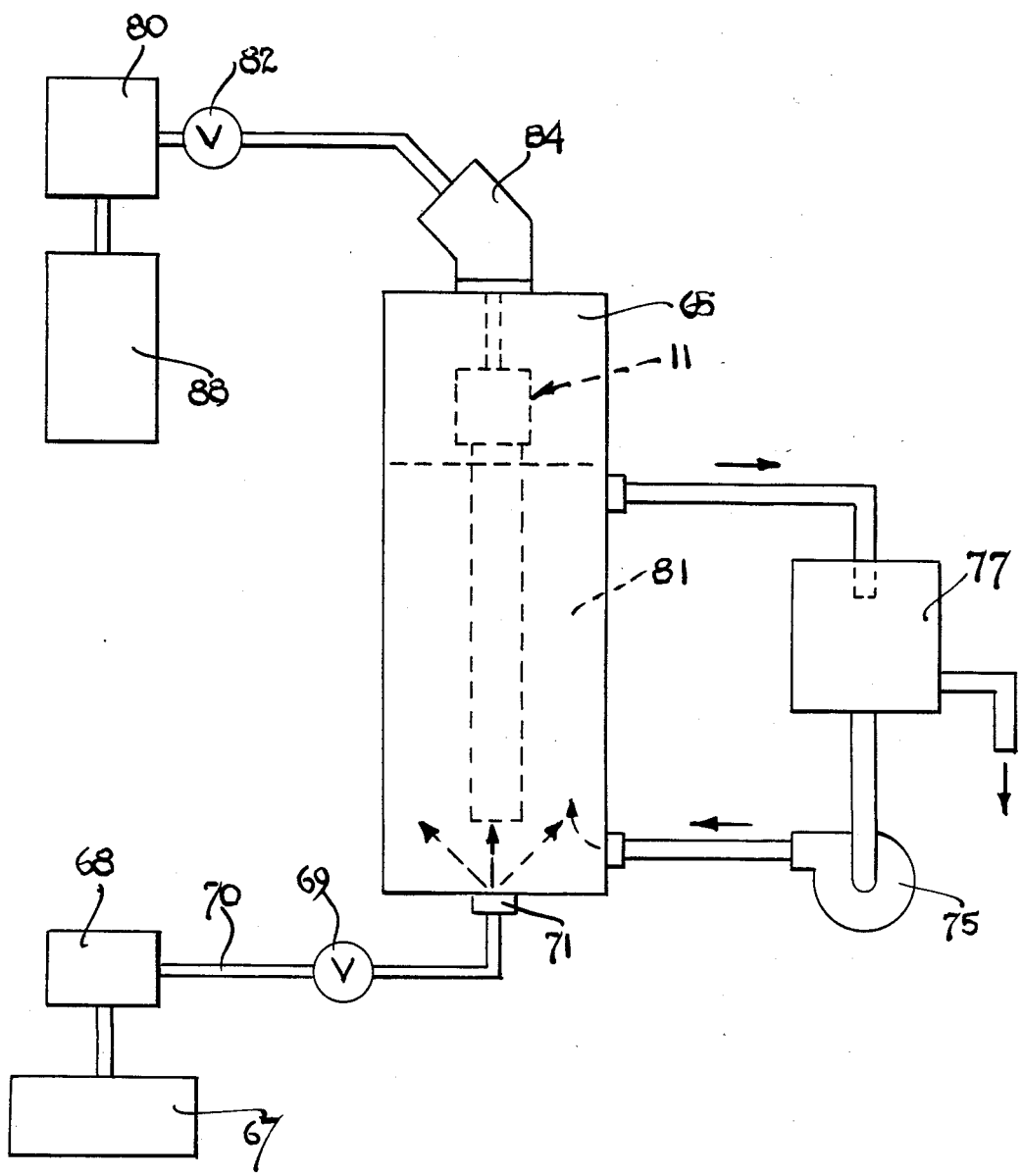
FIG. 5 is a schematic view illustrating another method for the employment of the device of the invention in leaching ore.

Referring now to FIG. 5, a further system for employing the device of the invention for leaching ore is schematically illustrated. In this embodiment, the rate of introduction of air into the leaching solution is controlled to optimize cavitation in the liquid which enhances the ore extraction. It has been found that the chemical kinetics involved in the leaching of minerals benefits considerably from having adequate amounts of oxygen as contained in air dispersed throughout the solution. The sonic wave action of the resonant bar is particularly effective for aiding such dispersion. It is essential, however, that the amount of air so added be controlled in view of the fact that too much air develops an emulsion type condition in the solution which tends to inhibit cavitation.

As shown in FIG. 5, tank 65 has one of the units of the invention 11 mounted therein. An air compressor 67 has a pressure regulator 68 and an air flow control 69 installed in its output line 70. Line 70 is connected to an inlet 71 in the bottom of tank 65. Thus, air in a regulated controlled flow is introduced into the liquid 81 contained in the tank in the sonic field of the energy radiated by unit 11 so that the air is dispersed into minute bubbles as it rises by gravity or liquid pressure around and past the sonic bar of unit 11. It is to be noted that the air should preferably be introduced so that it follows the liquid flow past the bar. Thus, in situations where the liquid flow is downward rather than upward, it is preferable to introduce the air at an upper portion of the tank so it is swept downwardly past the bar.

It is significant to note that in some situations only a few minutes or even less than a minute is required to obtain the desired leaching action. Also, in some situations, the air entrained in the liquid in view of its exposure to the ambient atmosphere can suffice to achieve the desired end results. However, in most situations, strong cavitation in the liquid will evacuate a substantial amount of the air from the liquid, so that unless the leaching is achieved in a relatively short time (usually less than a half hour), the controlled addition of air as indicated above is required.

The flow of liquid in the tank may be stimulated by means of a pump 75 connected to circulate the liquid in the tank as indicated by the arrows. The circulating system may include a sampling tank 77 from which samples of liquid can be taken and inspected to check the operation of the leaching system.

In order to control the cavitation in the liquid, it is sometimes desirable to limit the level of the acoustical energy generated in the solution. This end result is accomplished by controlling the input power to the oscillator of unit 11. This can achieved by controlling the hydraulic pressure output of hydraulic pump 80 which is fed to hydraulic motor 84 which drives the oscillator. This is achieved by means of flow control 82. Pump 80 is driven by pump drive 88.

The device and method of the present invention can also be useful in aiding the fermentation of organic material to produce enzymes and the like.

While the invention has been described and illustrated in detail, it is to be clearly understood that this is intended by way of illustration and illustration only, and is not to be taken by way of limitation, the spirit and scope of the invention being limited only by the terms of the following claims.

I claim:

1. A device for generating sonic energy for use in extracting minerals from ore placed in a liquid such as a leaching solution contained in a tank, and the like, said device being mounted in said tank, and comprising
   a housing,
   an elongated bar member,
   means for supporting said bar member in said housing,
   an orbiting mass oscillator attached to one end of said bar member, and
   means for driving said oscillator at a frequency such as to set up resonant standing wave vibration of said bar member,
   said means for supporting said bar member in said housing comprising a bore formed in the bottom end of said bar member along the longitudinal axis thereof, support means supported at one end thereof on said housing, said support means being fitted in said bore and in contact with said bar member solely at a point therealong where a node of said standing wave pattern appears, said support means comprising a support rod having cylindrical separator sleeves at the opposite ends thereof, said sleeve having a greater diameter than that of said support rod, receptacle means mounted on the bottom of said housing for receiving one of said sleeves, the other of said sleeve fitting snugly within an upper portion of the bore formed in said bar member, and cushioning means for cushioning said sleeves against said receptacle means and said bore and cushioned spoke means extending from said housing and in abutment against said bar member at at least one point therealong where a node of the standing wave pattern appears for centering said bar member and preventing the rotation thereof.

2. The device of claim 1 and further including means for introducing a regulated amount of air into said liquid to enhance the extraction of minerals from the ore.

3. A method for extracting minerals from ore comprising the steps of
   feeding ore material mixed in a liquid to a container,
   generating sonic energy with an orbiting mass oscillator,
   coupling the sonic energy to one end of an elastic bar to resonantly vibrate said bar to effect a quadrature nutating standing wave vibration pattern therein,
   said bar having a longitudinal bore formed therein, and being supported in a vertical orientation by means inserted in said bore, said bar being supported in gravity compression against said means inserted in said bore which means contacts said bar only at a node of the standing wave vibration pattern established therein.

4. The method of claim 3 wherein the ore material and liquid are flowed vertically along the bar.

5. The method of claim 3 and further including adding air to said ore material and liquid in a predetermined controlled quantity below that which prevents cavitation in the liquid.

* * * * *